(12) United States Patent
Sun et al.

(10) Patent No.: US 12,151,447 B2
(45) Date of Patent: Nov. 26, 2024

(54) TIRE VULCANIZING EQUIPMENT

(71) Applicant: HIMILE MECHANICAL SCIENCE AND TECHNOLOGY (SHANDONG) CO., LTD, Shandong (CN)

(72) Inventors: Riwen Sun, Shandong (CN); Longfei Gao, Shandong (CN); Zhilan Liu, Shandong (CN); Yang Zhao, Shandong (CN); Qiang Fang, Shandong (CN); Xitao Song, Shandong (CN)

(73) Assignee: Himile Mechanical Science and Technology (Shandong) Co., Ltd. (CN)

( * ) Notice: Subject to any disclaimer, the term of this patent is extended or adjusted under 35 U.S.C. 154(b) by 0 days.

(21) Appl. No.: 18/558,813

(22) PCT Filed: Sep. 23, 2022

(86) PCT No.: PCT/CN2022/120732
§ 371 (c)(1),
(2) Date: Nov. 3, 2023

(87) PCT Pub. No.: WO2023/103532
PCT Pub. Date: Jun. 15, 2023

(65) Prior Publication Data
US 2024/0239070 A1 Jul. 18, 2024

(30) Foreign Application Priority Data

Dec. 13, 2021 (CN) .......................... 202111521976.X (51) Int. Cl.
*B29D 30/06* (2006.01)

(52) U.S. Cl.
CPC ..... *B29D 30/0662* (2013.01); *B29D 30/0654* (2013.01); *B29D 2030/067* (2013.01)

(58) Field of Classification Search
CPC ........ B29D 30/0662; B29D 2030/0666; B29D 2030/0667; B29D 2030/067
See application file for complete search history.

(56) References Cited

U.S. PATENT DOCUMENTS 5,108,715 A    4/1992   Jekat et al.

FOREIGN PATENT DOCUMENTS

| CN | 104094508 A | 10/2014 |
| CN | 104742284 A | 7/2015 |

(Continued)

OTHER PUBLICATIONS

Translation of JP-59115827-A (Year: 1984).*

(Continued)

*Primary Examiner* — John J DeRusso
(74) *Attorney, Agent, or Firm* — MEDLER FERRO WOODHOUSE & MILLS PLLC (57) ABSTRACT

A tire vulcanizing machine, rubber vulcanizing apparatus, and in particular, tire vulcanizing equipment, including a mold assembly, a ring seat assembly provided in the mold assembly, a cylinder assembly supporting the ring seat assembly, a sealing hood for sealing a gas in the mold assembly, and a driving member. A gas circulating fan is provided on the ring seat assembly; a rotating shaft for driving the gas circulating fan to rotate is provided in the cylinder assembly; the driving member drives the rotating shaft to rotate; and the sealing hood isolates the driving member.

9 Claims, 11 Drawing Sheets

(56) References Cited

FOREIGN PATENT DOCUMENTS

| CN | 108883592 | A | | 11/2018 | | |
|---|---|---|---|---|---|---|
| CN | 209061033 | U | | 7/2019 | | |
| CN | 110181841 | A | | 8/2019 | | |
| CN | 114179409 | A | | 3/2022 | | |
| JP | 59115827 | A | * | 7/1984 | ......... | B29D 30/0662 |
| WO | WO-03074881 | A1 | * | 9/2003 | ......... | B29D 30/0662 |
| WO | WO-2010109603 | A1 | * | 9/2010 | ......... | B29D 30/0601 |
| WO | 2013164282 | A1 | | 11/2013 | | |
| WO | 2017162407 | A1 | | 9/2017 | | |

OTHER PUBLICATIONS

Translation of WO-03074881-A1 (Year: 2003).*
Translation of WO-2010109603-A1 (Year: 2010).*
Chinese Office Action dated Jul. 26, 2023 for Chinese Appl. No. 202111521976.X, with English translation (10 pages).
Chinese Notice of Allowance dated Sep. 7, 2023 for Chinese Appl. No. 202111521976.X, with English translation (2 pages).
International Search Report issued in PCT/CN2022/120732 mailed Nov. 7, 2022.

\* cited by examiner

TIRE VULCANIZING EQUIPMENT

TECHNICAL FIELD

The present invention relates to the fields of tire vulcanizing machines and rubber vulcanizing apparatuses, in particular to tire vulcanizing equipment.

BACKGROUND

Currently, tires are generally vulcanized by using a combination of saturated steam and nitrogen. Such a vulcanizing process particularly begins with the introduction of saturated steam into a vulcanizing bladder to provide heat needed for vulcanization.

However, with the energy shortage, rising steam prices and the "double carbon target" raised, electric heating vulcanizing machines are gradually applied, which are based on the principle of providing heater and fan or other disturbing components inside the bladder of the vulcanizing machine, and the motor or other driving device drives the fan or other disturbing components to rotate, to produce a uniform high temperature and high pressure environment inside the vulcanizing bladder.

However, the high temperature and high pressure environment will damage the motor, resulting in a shortened service life of the motor.

SUMMARY

Therefore, the technical problem to be solved by the present invention is to overcome the defects in the prior art that the motor has a shortened service life for it is subjected to high temperature and high pressure environment, and thus a tire vulcanizing equipment is provided.

In order to solve the above problem, the present invention provides a tire vulcanizing equipment comprising: a mold assembly having a vulcanizing bladder for molding a tire; a ring seat assembly provided on the mold assembly, the ring seat assembly having a gas circulating fan provided thereon; a cylinder assembly provided on the ring seat assembly, the cylinder assembly having a rotating shaft provided therein, the rotating shaft being adapted to drive the gas circulating fan to rotate; a driving member adapted to drive the rotating shaft to rotate; and a sealing hood adapted to seal the gas within the mold assembly; wherein the sealing hood is provided on the ring seat assembly and is located between the gas circulating fan and the rotating shaft, the rotating shaft driving the gas circulating fan to rotate by means of magnetic members; or, the sealing hood is provided within the cylinder assembly and is located between the rotating shaft and the driving member, the driving member driving the rotating shaft to rotate by means of the magnetic members.

Optionally, the sealing hood is provided on the ring seat assembly and is located between the gas circulating fan and the rotating shaft, the magnetic members comprising a first magnetic body provided on the gas circulating fan and a second magnetic body provided on the rotating shaft, the first magnetic body and the second magnetic body being provided correspondingly.

Optionally, an end of the rotating shaft is provided with an annular flange, the first magnetic body is provided on a bottom wall of the gas circulating fan, the second magnetic body is provided on the annular flange, and the first and second magnetic bodies are arranged along axial direction of the rotating shaft.

Optionally, an end of the rotating shaft is provided with an accommodating concave portion and the middle of the gas circulating fan is provided with a mating convex portion, the shape of the sealing hood being adapted to the accommodating concave portion and the mating convex portion, the mating convex portion extending into the accommodating concave portion, the first magnetic body is provided on the side wall of the mating convex portion, the second magnetic body is provided on the side wall of the accommodating concave portion, the first magnetic body and the second magnetic body being arranged along the radial direction of the rotating shaft.

Optionally, an end of the rotating shaft is provided with a mating convex portion and the middle of the gas circulating fan is provided with an accommodating concave portion, the shape of the sealing hood being adapted to the mating convex portion and the accommodating concave portion, the accommodating concave portion extending into the mating convex portion, the first magnetic body is provided on the side wall of the accommodating concave portion and the second magnetic body is provided on the side wall of the mating convex portion, the first magnetic body and the second magnetic body being arranged along the radial direction of the rotating shaft.

Optionally, the cylinder assembly comprises a cylinder body and a transmission box provided on the cylinder body, the sealing hood being provided on the transmission box and sealing the inner side from outer side of the transmission box, wherein a first transmission member driving the rotating shaft to rotate is provided inside the transmission box, and a second transmission member is provided outside the transmission box, the driving member being connected with the second transmission member, the first transmission member and the second transmission member respectively being located on either side of the sealing hood; and the magnetic members comprise a first magnetic body provided on the first transmission member and a second magnetic body provided on the second transmission member, the first magnetic body and the second magnetic body being provided correspondingly.

Optionally, the first transmission member comprises a first shaft body connected to the rotating shaft through a gear mechanism, and the second transmission member comprises a second shaft body connected to an output shaft of the driving member.

Optionally, the first magnetic body is provided on an end face of the first shaft body and the second magnetic body is provided on an end face of the second shaft body, both of which are arranged along the axial direction of the first shaft body.

Optionally, the sealing hood projects toward the outside of the transmission box, the first shaft body extends into the sealing hood, the second shaft body is provided with an accommodating concave portion on its end face, the sealing hood extends into the accommodating concave portion, the first magnetic body is provided on the side wall of the first shaft body, the second magnetic body is provided on the side wall of the accommodating concave portion, and the first magnetic body and the second magnetic body are arranged along the radial direction of the first shaft body.

Optionally, the driving member is a driving motor, and the tire vulcanizing equipment further comprises a motor hood, one end of the motor hood being connected to the transmission box, the other end of the motor hood being connected to the motor, the sealing hood and the second shaft body being located within the motor hood.

Optionally, the tire vulcanizing equipment further comprising a center rod provided through the ring seat assembly, the ring seat assembly comprising a ring seat and a heater; a first seal is provided between the sealing hood and the center rod, and a second seal is provided between the sealing hood and the ring seat.

Optionally, a third seal is provided between the sealing hood and the cylinder assembly.

The present invention has following advantages:

1. By means of the provision of the sealing hood, high temperature and high pressure gas is isolated and the driving motor is isolated outside the sealing hood, avoiding the problem of shortened service life of the driving motor due to the high temperature and high pressure gas, and thus increasing the service life of the driving motor by more than 60%.

2. By means of the provision of the sealing hood, the driving motor is not directly connected to the rotating shaft, avoiding the problems of high temperature, leakage and easy damage of the rotary seal, and also avoiding the influence of high temperature and high pressure on the service life of the driving motor, and further increase the service life of the driving motor.

BRIEF DESCRIPTION OF THE DRAWINGS

In order to more clearly illustrate the technical solutions in the specific embodiments or prior art of the present invention, accompanying drawings that need to be used in the description of the specific embodiments or prior art are briefly described in the following. It is obvious that the accompanying drawings in the following description are some of the embodiments of the present invention, and that other drawings can be obtained on the basis of these accompanying drawings without any creative work for those skilled in the art.

REFERENCE LIST 1 mold assembly; 2 ring seat assembly; 3 cylinder body; 4 center rod; 5 driving motor; 6 sealing hood; 11 upper mold; 12 lower mold; 13 vulcanizing bladder; 14 upper chuck; 15 upper compression ring; 16 lower chuck; 17 lower steel ring; 21 gas circulating fan; 211 mating convex portion; 22 heating medium vent; 23 heater; 24 ring seat; 31 transmission box; 311 first shaft body; 32 rotating shaft; 321 annular flange; 322 accommodating concave portion; 51 second shaft body; 52 motor hood; 61 first magnetic body; 62 second magnetic body; 63 first seal; 64 second seal; 65 third seal; 66 fourth seal; 7 fixing component.

DETAILED DESCRIPTION

The technical solutions of the present invention will be clearly and completely described below in conjunction with the accompanying drawings. Apparently, the described embodiments are some of the embodiments of the present invention, not all of them. Based on the embodiments of the present invention, all other embodiments obtained by those skilled in the art without making creative efforts fall into the protection scope of the present invention.

In the description of the present invention, it should be noted that the orientation or positional relationship indicated by the terms "center", "upper", "lower", "left", "right", "vertical", "horizontal", "inside", "outside" and the like are based on the orientation or positional relationships shown in the accompanying drawings and are intended only to facilitate and simplify the description of the invention instead of indicating or implying that the device or element referred to must have a particular orientation, must be constructed and operated in a particular orientation, and therefore shall not be construed as limiting the invention. Furthermore, the terms "first", "second" and "third" are used for descriptive purposes only and shall not be construed as indicating or implying relative importance.

In the description of the present invention, it is to be noted that, unless otherwise expressly specified and limited, the terms "mount", "connect", "couple" shall be understood in a broad sense. For example, it can be a fixed connection, a removable connection, or an integral connection; it can be a mechanical connection or an electrical connection; it can be a direct connection or an indirect connection through an intermediate medium, and it can be a connection within two elements. Those skilled in the art can understand the specific meanings of the above terms in the present invention according to specific situations.

In addition, the technical features involved in the different embodiments of the invention described below can be combined with each other as long as they do not conflict to each other.

First Embodiment

Figure 1:
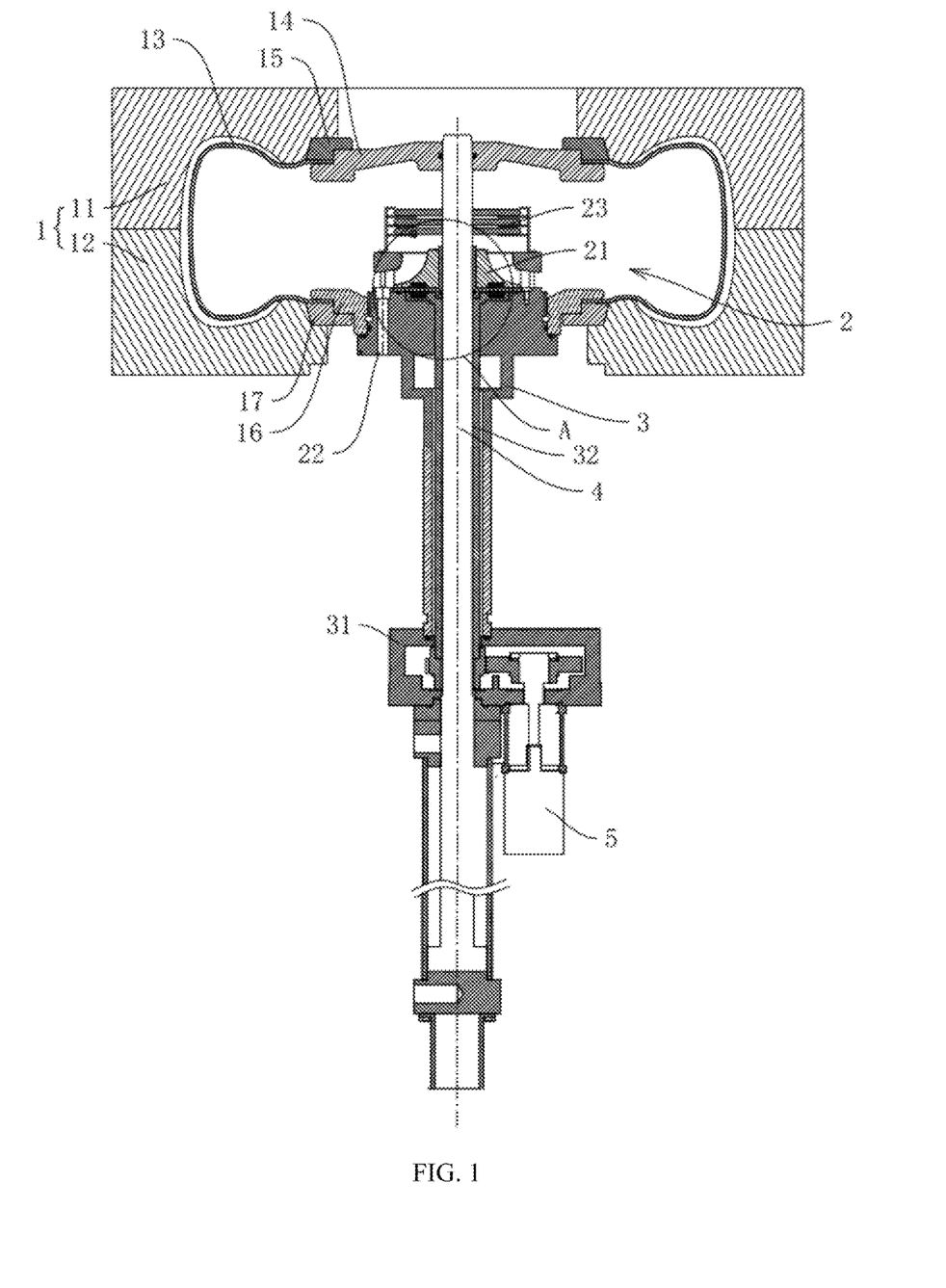
FIG. 1 illustrates an overall schematic diagram of the tire vulcanizing equipment of a first embodiment of the present invention.

Referring to FIG. 1, the present invention discloses a tire vulcanizing equipment comprising a mold assembly 1, a ring seat assembly 2 provided on the inside of the mold assembly 1, a cylinder assembly supporting the ring seat assembly 2, a driving member and a transmission assembly, the ring seat assembly 2 being provided with a gas circulating fan 21, the driving member driving the gas circulating fan 21 via the transmission assembly, the cylinder assembly comprising a cylinder body 3 and a transmission box 31 provided on the cylinder body 3.

Figure 2:
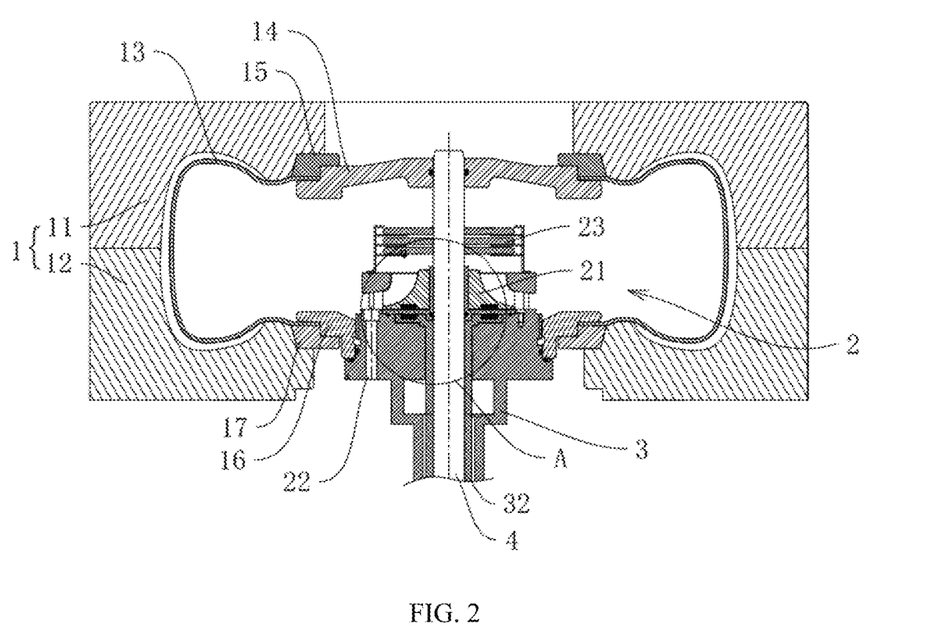
FIG. 2 illustrates a partial schematic diagram of the tire vulcanizing equipment of the first embodiment of the present invention.

Referring to FIGS. 1 and 2, the mold assembly 1 is a two-half mold, and may also be a two-half segment mold, an upper open segment mold or a lower open segment mold. Particularly, the mold assembly 1 comprises an upper mold 11 and a lower mold 12, and the mold assembly 1 is also provided with a vulcanizing bladder 13 inside it for molding the tire. The ring seat assembly 2 is located inside the vulcanizing bladder 13, and is provided with a heating medium vent 22. The heating medium is preferably nitrogen. The ring seat assembly 2 is provided with a gas circulation fan 21 and a heater 23 which may be an electric heating tube, an induction heater, an infrared heater, a heat exchanger, etc. The heater 23 heats the heating medium, and the gas circulating fan 21 drives the flow of the heating medium to flow, ensuring efficient heat transfer to the vulcanizing bladder 13 and uniform temperature inside the vulcanizing bladder 13, to facilitate tire molding. The gas circulating fan may be an impeller, axial fan, etc.

Referring to FIGS. 1 and 2, the tire vulcanizing equipment further comprises a center rod 4 threaded through the ring seat assembly 2. The mold assembly 1 further comprises an upper chuck 14, an upper compression ring 15, a lower chuck 16, and a lower steel ring 17, wherein the upper chuck 14 and the upper compression ring 15 clamp the upper edge of the vulcanizing bladder 13, and the lower chuck 16 and the lower steel ring 17 clamp the lower edge of the vulcanizing bladder 13. The lower chuck 16 is fixed to the ring seat assembly 2, and more particularly, the ring seat assembly 2 comprises a ring seat 24, and the lower chuck 16 is threadedly connected to the ring seat 24 and sealed with the ring seat 24 by a seal, which may be a sealing ring. The top end of the center rod 4 is threaded to the upper chuck 14 and is fixedly connected to, such as bolted to the upper chuck 14, and the top end of the center rod 4 is sealed to the upper chuck 14 by a seal, which may be a seal ring. The sealing system is formed by the inside of the mold assembly 1, the vulcanizing bladder 13, the ring seat assembly 2, and the cylinder assembly, and the driving member is provided outside the sealing system to reduce the damage to the driving member by the high temperature and high pressure environment inside the sealing system.

Referring to FIGS. 1 and 2, the ring seat 24 and the cylinder body 3 can be provided as an integral structure, or they can also be bolted together and can also be sealed by a seal therebetween, the seal may be a sealing ring.

The transmission box 31 and the cylinder body 3 can be provided as an integral structure, or of course they can also be bolted together and sealed by a seal therebetween, the seal may be a sealing ring. Referring to FIGS. 1 and 2, the driving member is a driving motor 5, or it can be a combustion engine. Here the preferred solution is a driving motor 5. The driving motor 5 drives the rotating shaft 32 to rotate, and in turn drives the gas circulating fan 21. The sealing system comprises a sealing hood 6, the material of which can be Hallestoy®, titanium alloy, etc. The sealing hood 6 can function for sealing, magnetic conductivity and reducing eddy current of magnetic field. The sealing hood 6 is provided on the ring seat assembly 2 and is located between the gas circulating fan 21 and the rotating shaft 32, the gas circulating fan 21 can rotate unimpeded relative to the sealing hood 6, and the rotating shaft 32 drives the gas circulating fan 21 via magnetic members. Wherein a first seal 63 is provided between the sealing hood 6 and the center rod, and a second seal 64 is provided between the seal hood 6 and the ring seat, both the first seal 63 and the second seal 64 being sealing rings.

Figure 3:
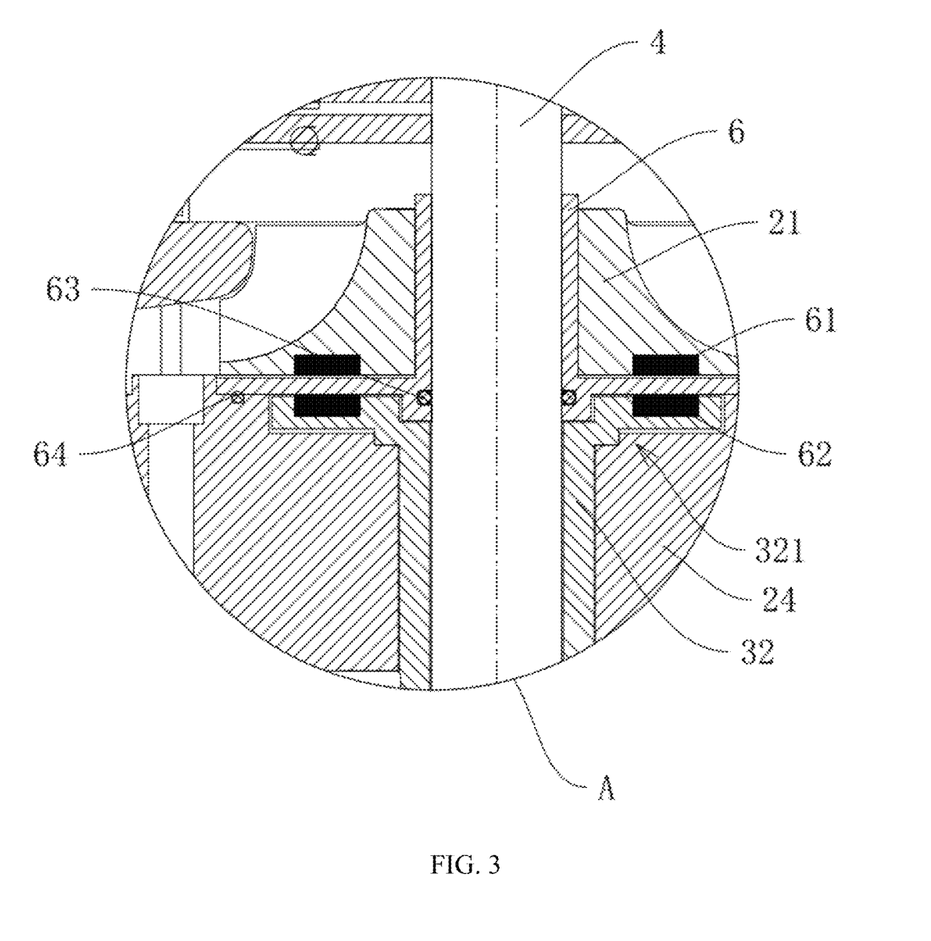
FIG. 3 illustrates an enlarged view at part A in FIG. 2.

Referring to FIGS. 2 and 3, the magnetic members particularly comprise a first magnetic body 61 provided at the bottom of the gas circulating fan 21 and a second magnetic body 62 provided at the top of the rotating shaft 32, wherein both the first magnetic body 61 and the second magnetic body 62 are magnets, particularly permanent magnets, and the first magnetic body 61 and the second magnetic body 62 have opposite magnetic poles. Further, the top end of the rotating shaft 32 is provided with an annular flange 321 on which the second magnetic body 62 is provided, and the first magnetic body 61 and the second magnetic body 62 are positioned so that they correspond in the upper and lower positions, that is, the first magnetic body 61 and the second magnetic body 62 are disposed along the axial direction of the rotating shaft 32. Wherein, the sealing hood 6 is located between the top end of the rotating shaft 32 and the gas circulating fan 21, the sealing hood 6 is sleeved on the center rod 4, a sealing ring is provided between the sealing hood 6 and the center rod 4, and a sealing ring is provided between the sealing hood 6 and the ring seat 24 for sealing.

Figure 4:
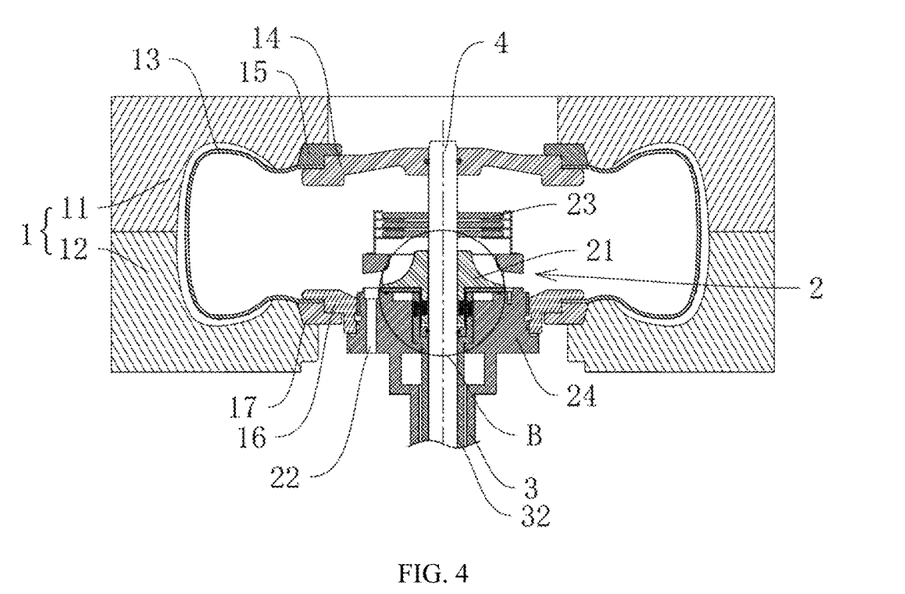
FIG. 4 illustrates a schematic diagram of one implementation of the first magnetic body and the second magnetic body radially disposed of the first embodiment of the present invention.
Figure 5:
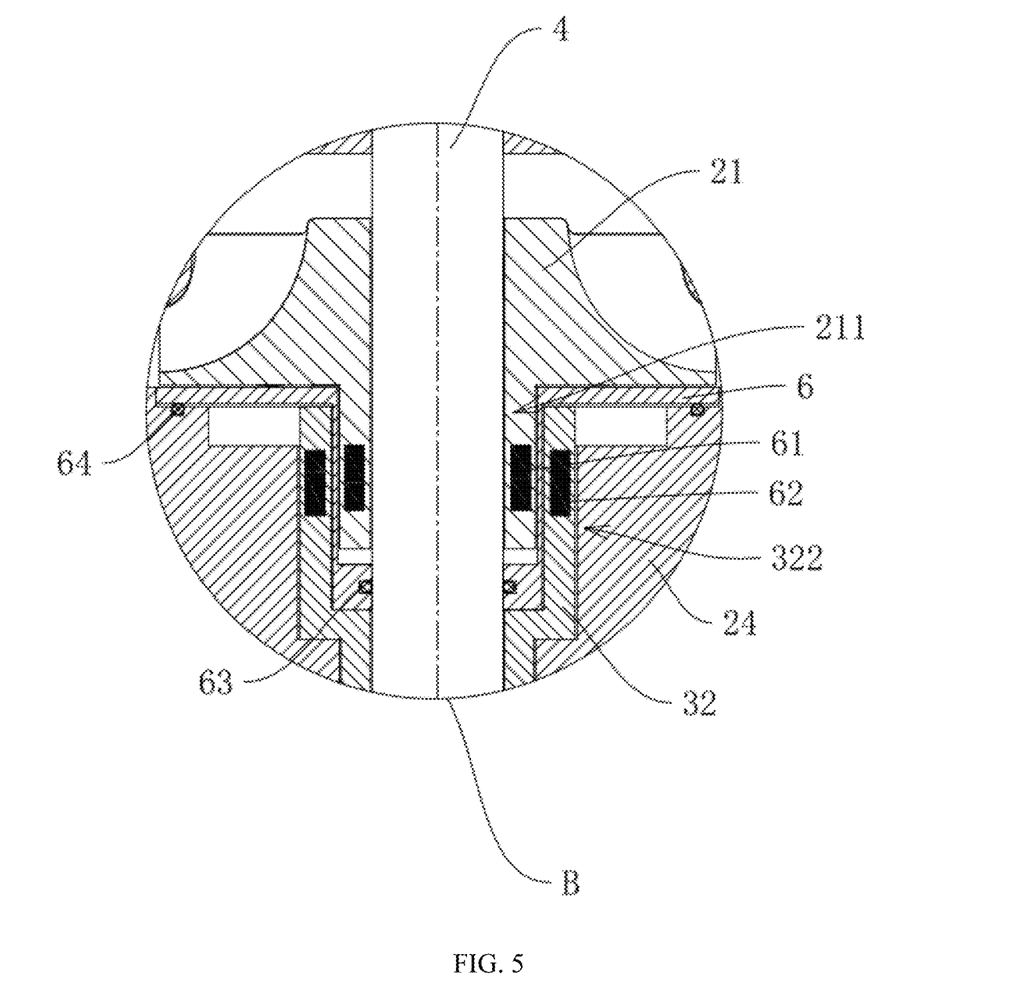
FIG. 5 illustrates an enlarged view at part B in FIG. 4.

Referring to FIGS. 4 and 5, in an alternative implementation, the first magnetic body 61 and the second magnetic body 62 may also be positioned in a horizontal direction in correspondence, that is, the first magnetic body 61 and the second magnetic body 62 are arranged along the radial direction of the rotating shaft 32. In particular, the top of the rotating shaft 32 is provided with an accommodating concave portion 322, and the middle part of the bottom end of the gas circulating fan 21 is provided with a cooperating convex portion 211, where the shape of the sealing hood 6 is adapted to the gap between the accommodating concave portion 322 and the cooperating convex portion 211. During installation, the cooperating convex portion 211 extends into the accommodating concave portion 322, the first magnetic body 61 is arranged on the side wall of the cooperating convex portion 211, and the second magnetic body 62 is arranged on the side wall of the accommodating concave portion 322.

Figure 6:
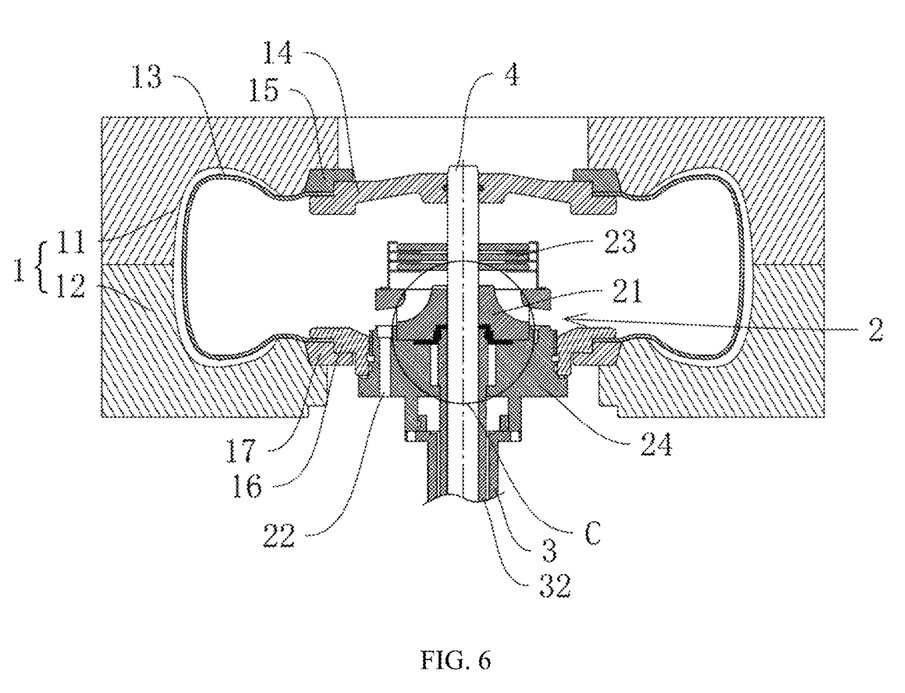
FIG. 6 illustrates a schematic diagram of another implementation of the first magnetic body and the second magnetic body radially disposed of the first embodiment of the present invention.
Figure 7:
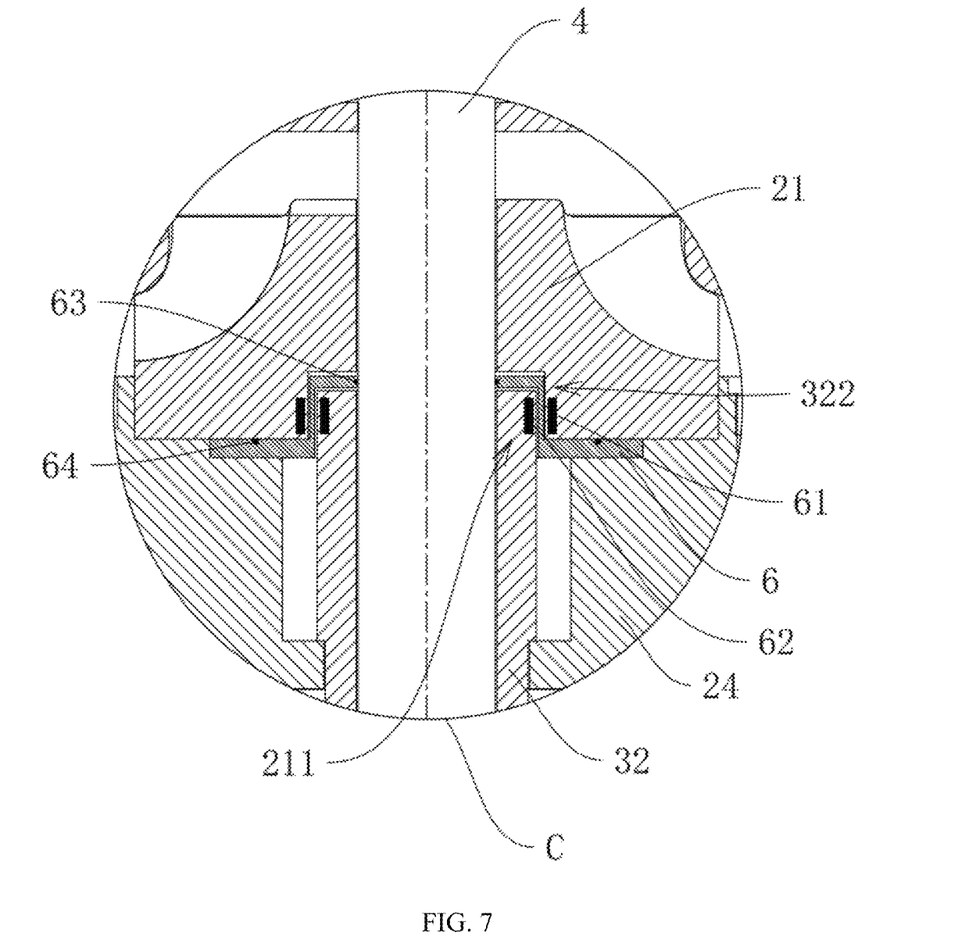
FIG. 7 illustrates an enlarged view at part C in FIG. 6.

Referring to FIGS. 6 and 7, in another embodiment in which the first magnetic member and the second magnetic member are arranged in the radial direction of the rotating shaft 32, the concave-convex fit of the top end of the rotating shaft 32 and the gas circulating fan 21 changes, that is, the top end of the rotating shaft 32 is provided with a cooperating convex portion 211 and the middle part of the bottom surface of the gas circulating fan 21 is provided with an accommodating concave portion 322, and the sealing hood 6 is shaped to fit with the gap between the cooperating convex portion 211 and the accommodating concave portion 322. During installation, the accommodating concave portion 322 extends into the cooperating convex portion 211, the first magnetic body 61 is arranged on the side wall of the accommodating concave portion 322, and the second magnetic body 62 is arranged on the side wall of the cooperating convex portion 211.

The implementation principle of the embodiment of the present invention is that at the beginning of tire vulcanizing, nitrogen is charged into the interior of the vulcanizing bladder 13 through the heating medium vent 22 to provide internal pressure to the vulcanizing bladder 13, and the heater 23 generates heat to provide heat to the vulcanizing bladder 13. The driving motor 5 is operated such that the output shaft of the driving motor 5 drives the rotating shaft 32 to rotate, and the gas circulating fan 21 works by means of the attraction of the first magnetic body 61 and the second magnetic body 62, to urge nitrogen circulation inside the vulcanizing bladder 13, thus improving the temperature uniformity. Among them, the driving motor 5 is isolated outside the sealing system by the sealing hood 6, such that the driving motor 5 works in a low temperature and pressure-free environment, reducing the damage to the driving motor 5, thus improving the service life of the driving motor 5.

Second Embodiment

Figure 8:
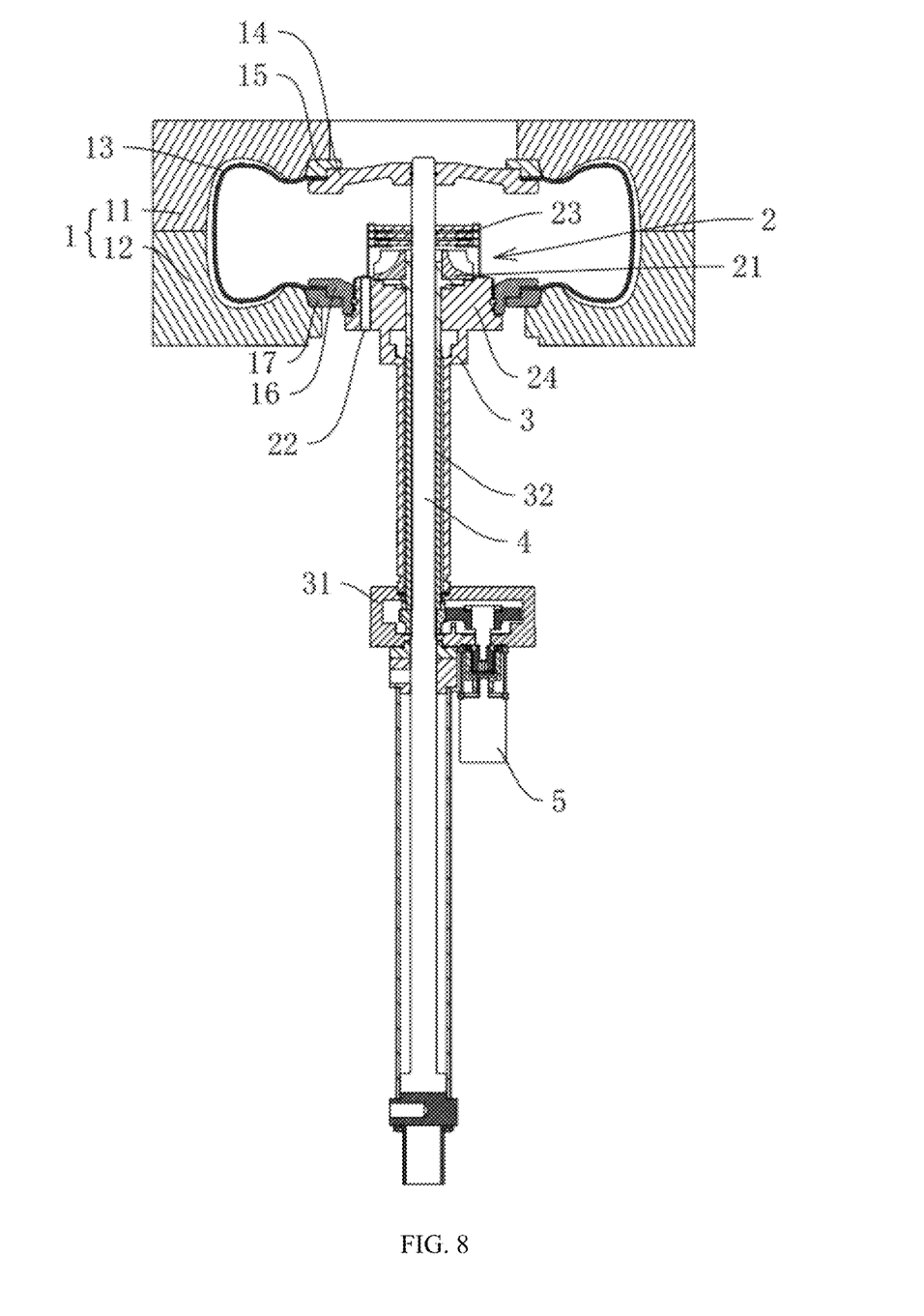
FIG. 8 illustrates an overall schematic diagram of the tire vulcanizing equipment of a second embodiment of the present invention.
Figure 9:
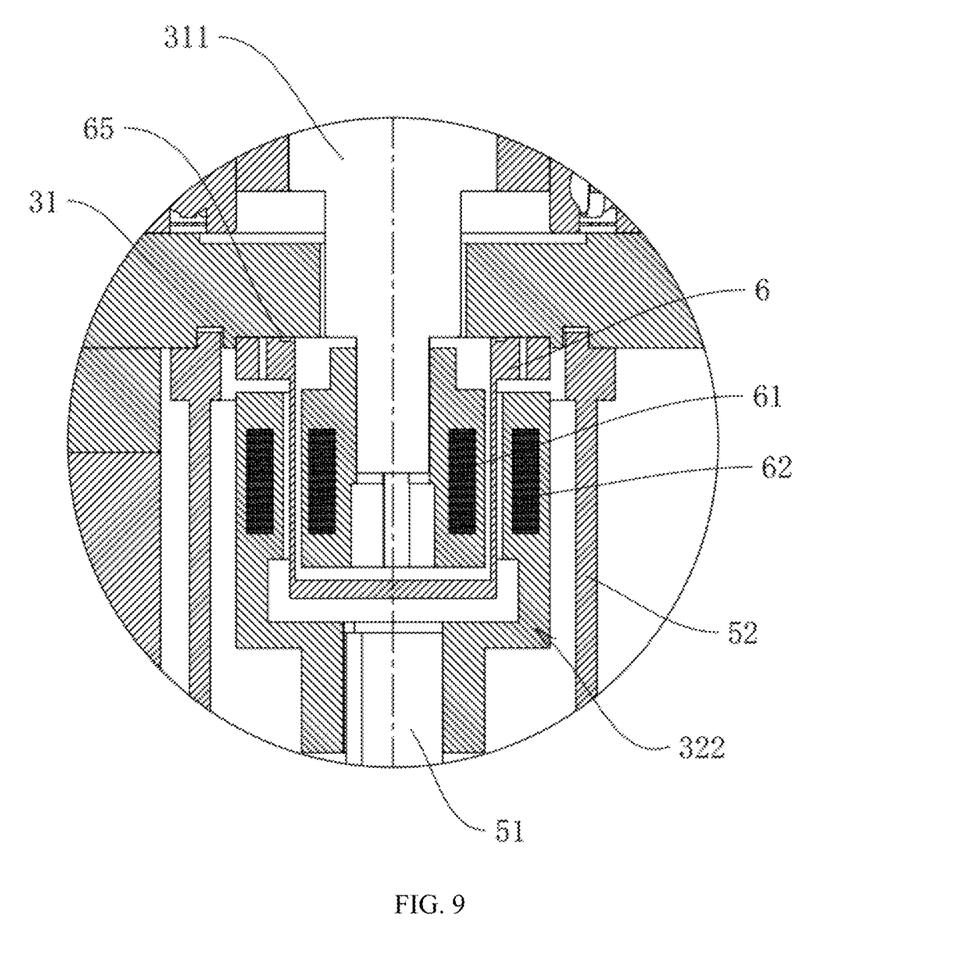
FIG. 9 illustrates a schematic diagram of one implementation of the first magnetic body and the second magnetic body radially disposed at the sealing hood of the second embodiment of the present invention.

The difference between the second embodiment and the first embodiment is that the first magnetic body 61 and the second magnetic body 62 are provided in different positions. Referring to FIGS. 8 and 9, the transmission assembly comprises a first transmission member and a second transmission member, the first transmission member being a first shaft body 311 and the second transmission member being a second shaft body 51. The tire vulcanizing equipment further comprises a transmission box 31 provided on the cylinder body 3 with a rotating shaft 32 threading through the transmission box 31, the rotating shaft 32 being a hollow shaft sleeved on the center rod 4 and provided in the cylinder body 3, the top end of the rotating shaft 32 being connected to and driving the gas circulating fan 21 to rotate. The first shaft body 311 is provided in the transmission box 31. The first shaft body 311 and the rotating shaft 32 are engaged by means of gears, or may be driven by belts or sprockets. In this solution, they are preferably gear meshed.

The lower end of the transmission box 31 and the center rod 4 may be sealed by a seal, or the lower end of the transmission box 31 and a fixed component 7 outside of the center rod 4 are sealed by a fourth seal 66. The fixed component 7 may be a cylinder block and the seal may be a sealing ring.

Referring to FIGS. 8 and 9, the driving motor 5 is fixed to the transmission box 31, and the tire vulcanizing equipment further comprises a motor hood 52, one end of the motor hood 52 being connected to the transmission box 31, and the other end of the motor hood 52 being connected to the driving motor 5, and the way of connection can be bolted or welded. The output shaft of the driving motor 5 is also connected to a second shaft body 51, which may be connected by screws or couplings. The sealing hood 6 is provided on the transmission box 31 to separate the first shaft body 311 and the second shaft body 51 apart, and both the second shaft body 51 and the sealing hood 6 are located inside the motor hood 52. The axis of the first shaft body 311 and the second shaft body 51 are the same. In this solution, the first shaft body 311 and the second shaft body 51 are connected by magnetic components, so that the second shaft body 51 can drive the first shaft body 311 to rotate.

In particular, the first magnetic body 61 is provided on the first shaft body 311, the second magnetic body 62 is provided on the second shaft body 51, wherein the first shaft body 311 projects outwardly, the end of the second shaft body 51 is recessed near the first shaft body 311 to form an accommodating concave portion 322, and the second magnetic body 62 is located on the side wall of the accommodating concave portion 322 to cover the projecting end of the first shaft body 311, such that the first magnetic body 61 is provided radially opposite to the second magnetic body 62 relative to the first shaft body 311, and with the attraction of the first magnetic body 61 to the second magnetic body 62, when the driving motor 5 drives the second shaft body 51 to rotate, the second shaft body 51 can follow the rotation, and in turn transmit the movement to the rotating shaft 32 which drives the gas circulating fan 21 to rotate. There is also a third seal 65 provided between the sealing hood 6 and the transmission box 31, and the third seal 65 seals the gap between the sealing hood 6 and the transmission box 31. The third seal 65 is preferably a sealing ring.

Figure 10:
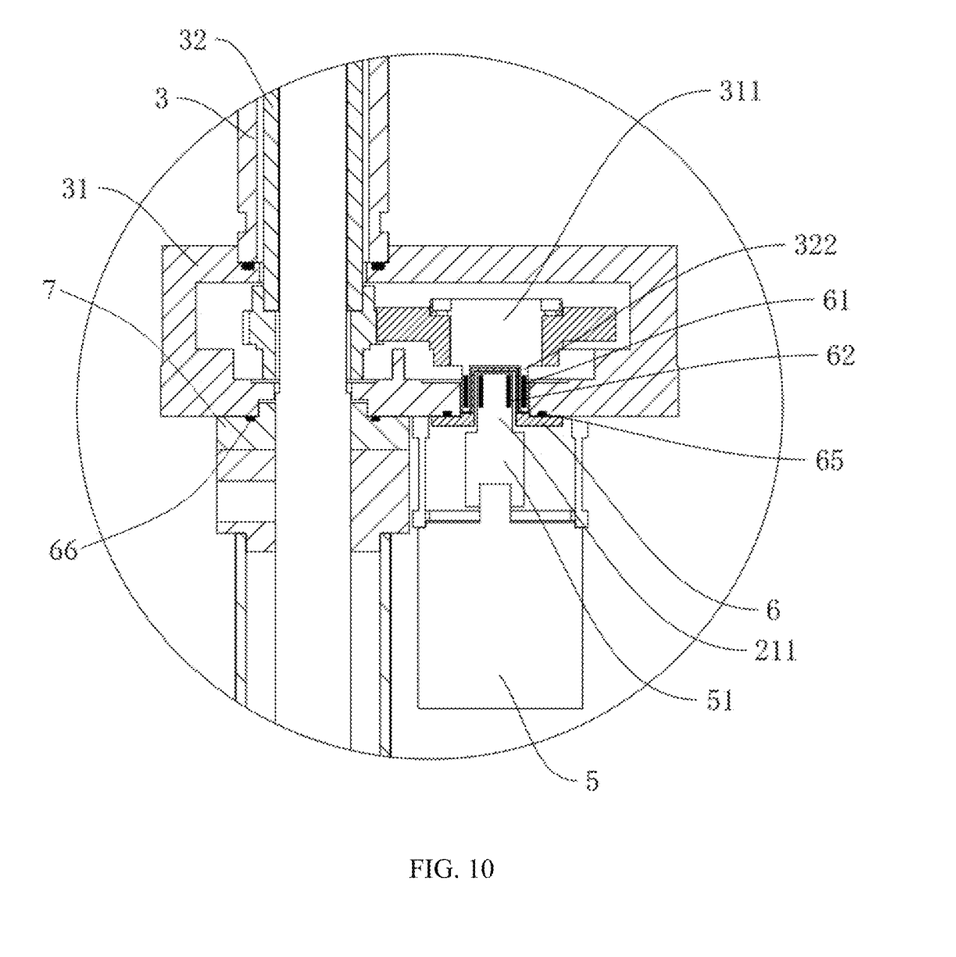
FIG. 10 illustrates a schematic diagram of another implementation of the first magnetic body and the second magnetic body radially disposed at the sealing hood of the second embodiment of the present invention.

In another embodiment, referring to FIGS. 8 and 10, the concave-convex fit between the first shaft body 311 and the second shaft body 51 is also interchangeable, that is, the end of the first shaft body 311 near the second shaft body 51 is provided with an accommodating concave portion 322, and the end of the second shaft body 51 near the first shaft body 311 is provided with a cooperating convex portion 211, and when the first shaft body 311 and the second shaft body 51 fit to each other, the cooperating convex portion 211 is located in the accommodating concave portion 322. Wherein, the first magnetic body 61 is provided on the side wall of the accommodating concave portion 322, the second magnetic body 62 is provided on the side wall of the cooperating convex portion 211, and the first magnetic body 61 and the second magnetic body 62 are provided side by side in the radial direction of the first shaft body 311.

The implementation principle of this embodiment of the present invention is that at the beginning of tire vulcanizing, nitrogen is charged into the interior of the vulcanizing bladder 13 through the heating medium vent 22 to provide internal pressure to the vulcanizing bladder 13, and the heater 23 generates heat to provide heat to the vulcanizing bladder 13. The driving motor 5 is operated such that the output shaft of the driving motor 5 drives the rotating shaft 32 to rotate, and by means of the attraction of the first magnetic body 61 and the second magnetic body 62, the second shaft 51 drives the first shaft 311 to rotate, and the first shaft 311 drives the rotating shaft 32 by means of the engagement of the gears to rotate the rotating shaft 32, so that the rotating shaft 32 rotates together, and the rotating shaft 32 then drives the gas circulating fan 21 to work, urging the nitrogen circulation inside the vulcanizing bladder 13 and improving the temperature uniformity. Wherein, the driving motor 5 is isolated outside the sealing system by the sealing hood 6, which reduces the damage to the driving motor 5.

Figure 11:
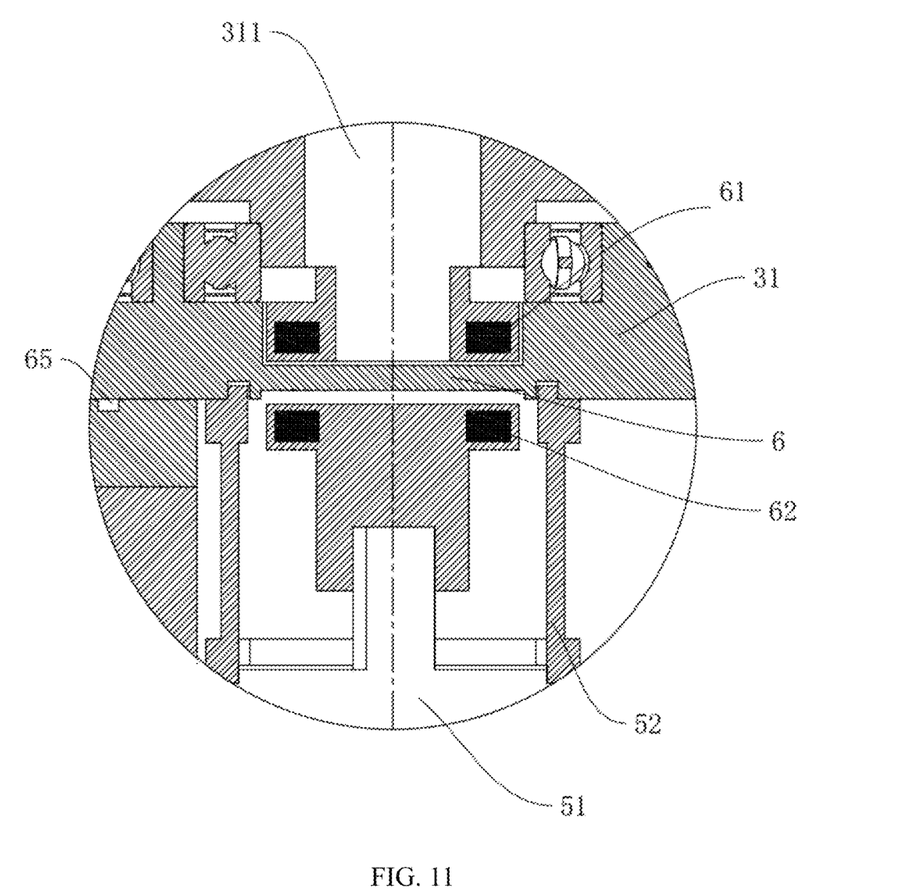
FIG. 11 illustrates a schematic diagram of one implementation of the first magnetic body and the second magnetic body axially disposed at the sealing hood of the second embodiment of the present invention.

In another embodiment, the first magnetic body 61 and the second magnetic body 62 are provided at different positions. Referring to FIG. 11, particularly, the first shaft body 311 and the second shaft body 51 are provided coaxially, the sealing hood 6 separates the first shaft body 311 and the second shaft body 51 apart, the first magnetic body 61 is provided at the end of the first shaft body 311 near the second shaft body 51, and the second magnetic body 62 is provided at the end of the second shaft body 51 near the first shaft body 311. At this time, the first axis body 311 and the second axis body 51 are axially facing each other. When the second shaft body 51 rotates, the first shaft body 311 is rotated by means of magnetic attraction between the first magnetic body 61 and the second magnetic body 62.

Obviously, the above embodiments are merely examples for clarity rather than limiting the implementation. For a person of ordinary skill in the art, there are other variations or changes that can be made in different forms based on the above description. It is not necessary or possible to exhaust all embodiments here. The obvious variations or changes derived therefrom are still within the scope of protection of the invention.

What is claimed is:

1. A tire vulcanizing equipment comprising:
a mold assembly provided with a vulcanizing bladder inside of the mold assembly for tire molding;
a ring seat assembly provided inside the mold assembly, the ring seat assembly including a ring seat, above which the ring seat assembly is provided with a heater and a gas circulating fan, the ring seat assembly is provided with a heating medium vent;
a cylinder assembly provided below the ring seat assembly for supporting the ring seat assembly, the cylinder assembly comprising a center rod threaded through the ring seat assembly, the cylinder assembly having a rotating shaft provided within the cylinder assembly, the rotating shaft being adapted to drive the gas circulating fan to rotate, the rotating shaft is a hollow shaft and is sleeved on the center rod;
a driving member adapted to drive the rotating shaft to rotate;
a sealing hood adapted to seal off gas inside the mold assembly;
wherein when tire vulcanizing starts, heating medium is filled into the vulcanizing bladder via the heating medium vent to provide interior pressure for the vulcanizing bladder, the heater heats to provide heat to the vulcanizing bladder, the gas circulating fan promotes circulation of the heating medium within the vulcanizing bladder;
wherein the sealing hood is provided on the ring seat assembly and is located between the gas circulating fan and the rotating shaft, the rotating shaft driving the gas circulating fan to rotate by means of magnetic members;
the magnetic members comprising a first magnetic body provided on the gas circulating fan and a second magnetic body provided on the rotating shaft, the first magnetic body and the second magnetic body being provided correspondingly;
the sealing hood is located between a top end of the rotating shaft and the gas circulating fan, the sealing hood is sleeved on the center rod; a first seal is provided between the sealing hood and the center rod, and a second seal is provided between the sealing hood and the ring seat;
a sealing system is formed by the inside of the mold assembly, the vulcanizing bladder, the ring seat assembly, and the cylinder assembly, and the driving member is provided outside the sealing system.

2. The tire vulcanizing equipment according to claim 1, wherein the top end of the rotating shaft is provided with an annular flange, wherein the first magnetic body is provided on a bottom wall of the gas circulating fan, the second magnetic body is provided on the annular flange, and the first magnetic body and second magnetic body are arranged along an axial direction of the rotating shaft.

3. The tire vulcanizing equipment according to claim 1, wherein an end of the rotating shaft is provided with an accommodating concave portion and a middle part of the gas circulating fan is provided with a cooperating convex portion, a shape of the sealing hood being adapted to the accommodating concave portion and the cooperating convex portion, the cooperating convex portion extending into the accommodating concave portion, wherein the first magnetic body is provided on a side wall of the cooperating convex portion and the second magnetic body is provided on a side wall of the accommodating concave portion, the first magnetic body and the second magnetic body being arranged along a radial direction of the rotating shaft.

4. The tire vulcanizing equipment according to claim 1, wherein an end of the rotating shaft is provided with a cooperating convex portion and a middle part of the gas circulating fan is provided with an accommodating concave portion, a shape of the sealing hood being adapted to the cooperating convex portion and the accommodating concave portion, the cooperating convex portion extending into the accommodating concave portion, wherein the first magnetic body is provided on a side wall of the accommodating concave portion and the second magnetic body is provided on a side wall of the cooperating convex portion, the first magnetic body and the second magnetic body being arranged along a radial direction of the rotating shaft.

5. A tire vulcanizing equipment, characterized in that the tire vulcanizing equipment comprises:
a mold assembly provided with a vulcanizing bladder inside of the mold assembly for tire molding;
a ring seat assembly provided inside the mold assembly, the ring seat assembly including a ring seat, above which the ring seat assembly is provided with a heater and a gas circulating fan, the ring seat assembly is provided with a heating medium vent;
a cylinder assembly provided below the ring seat assembly for supporting the ring seat assembly, the cylinder assembly comprising a center rod threaded through the ring seat assembly, the cylinder assembly having a rotating shaft provided within the cylinder assembly, the rotating shaft being adapted to drive the gas circulating fan to rotate, the rotating shaft is a hollow shaft and is sleeved on the center rod;
a driving member adapted to drive the rotating shaft to rotate;
a sealing hood adapted to seal off gas inside the mold assembly;
when tire vulcanizing starts, heating medium is filled into the vulcanizing bladder via the heating medium vent to provide interior pressure for the vulcanizing bladder, the heater heats to provide heat to the vulcanizing bladder, the gas circulating fan promotes circulation of the heating medium within the vulcanizing bladder;
wherein the sealing hood is provided on the cylinder assembly and is located between the rotating shaft and the driving member, a top end of the rotating shaft connects to the gas circulating fan, the driving member driving the rotating shaft to rotate by means of magnetic members;
the cylinder assembly comprises a cylinder body and a transmission box provided on the cylinder body, the sealing hood being provided on the transmission box and sealing an inner space and an outer space of the transmission box, wherein a first transmission member driving the rotating shaft to rotate is provided inside the transmission box, and a second transmission member is provided outside the transmission box, the driving member being connected to the second transmission member, the first transmission member and the second transmission member being located on either side of the sealing hood respectively; and the magnetic members comprise a first magnetic body provided on the first transmission member and a second magnetic body provided on the second transmission member, the first magnetic body and the second magnetic body being provided correspondingly;
the first transmission member comprises a first shaft body connected to the rotating shaft through a gear mechanism, and the second transmission member comprises a second shaft body connected to an output shaft of the driving member;

the sealing hood is provided on the transmission box to separate the first shaft body and the second shaft body apart; a third seal is provided between the sealing hood and the cylinder assembly; and a lower end of the transmission box seals with the center rod by a seal, or the lower end of the transmission box seals with a fixing component outside the center rod by a fourth seal.

6. The tire vulcanizing equipment according to claim 5, wherein the first magnetic body is provided on an end face of the first shaft body and the second magnetic body is provided on an end face of the second shaft body, the first magnetic body and the second magnetic body are arranged along an axial direction of the first shaft body.

7. The tire vulcanizing equipment according to claim 6, wherein the driving member is a driving motor, and the tire vulcanizing equipment further comprises a motor hood, one end of the motor hood being connected to the transmission box, an other end of the motor hood being connected to the driving motor, the sealing hood and second shaft body both being located within the motor hood.

8. The tire vulcanizing equipment according to claim 5, wherein the sealing hood projects toward an outside of the transmission box, the first shaft body extends into the sealing hood, the second shaft body is provided with an accommodating concave portion on its end face, the sealing hood extends into the accommodating concave portion, the first magnetic body is provided on a side wall of the first shaft body, the second magnetic body is provided on a side wall of the accommodating concave portion, and the first magnetic body and the second magnetic body are arranged along a radial direction of the first shaft body.

9. The tire vulcanizing equipment according to claim 8, wherein the driving member is a driving motor, and the tire vulcanizing equipment further comprises a motor hood, one end of the motor hood being connected to the transmission box, an other end of the motor hood being connected to the driving motor, the sealing hood and second shaft body both being located within the motor hood.

* * * * *